United States Patent [19]

Brambilla

[11] Patent Number: 4,880,268
[45] Date of Patent: Nov. 14, 1989

[54] FRONT SEAT FOR A MOTOR VEHICLE HAVING ONLY TWO SIDE DOORS

[75] Inventor: Silvio Brambilla, Turino, Italy

[73] Assignee: Sicam Societa' Italiana Cuscini A Molle S.p.A., Turino, Italy

[21] Appl. No.: 187,201

[22] Filed: Apr. 28, 1988

[30] Foreign Application Priority Data

Apr. 28, 1987 [IT] Italy ................................ 53272[U]
Nov. 4, 1987 [IT] Italy ........................................ 67938
Nov. 4, 1987 [IT] Italy ........................................ 67939
Apr. 1, 1988 [IT] Italy ........................................ 67294

[51] Int. Cl.$^4$ ............................................. B60N 1/02
[52] U.S. Cl. ................................. 296/65.1; 297/341
[58] Field of Search ................... 296/65.10; 297/317, 297/322, 341

[56] References Cited

U.S. PATENT DOCUMENTS

| | | | |
|---|---|---|---|
| 2,826,241 | 3/1958 | Himka | 296/65.1 |
| 2,982,335 | 5/1961 | Garvey | 296/65.1 |
| 4,065,178 | 12/1977 | Carella et al. | 297/341 |
| 4,131,316 | 12/1978 | Pallant et al. | 297/341 |
| 4,787,674 | 11/1988 | Inaba et al. | 297/317 |

Primary Examiner—Robert R. Song
Attorney, Agent, or Firm—Sughrue, Mion, Zinn, Macpeak & Seas

[57] ABSTRACT

A front seat (1) for a motor vehicle with only two side doors includes a frame and a device for connecting the frame to the floor (15) of the motor vehicle which enable the seat to be moved between a normal operative position and a forward inoperative position in which access to the rear seats of the motor vehicle is facilitated, the connection device comprising at least one pin-slot coupling (23, 25) operatively interposed between the seat frame and the floor (15) of the motor vehicle and also including guides (5) allowing the adjustment of the operative position of the seat longitudinally of the motor vehicle. The seat further includes an auxiliary support structure (7) which supports the seat frame. The guides are operatively interposed between the seat frame and the auxiliary support structure (7). The pin-slot coupling (23, 25) is operatively interposed between the auxiliary support structure (7) and the floor (15) of the motor vehicle.

25 Claims, 11 Drawing Sheets

FRONT SEAT FOR A MOTOR VEHICLE HAVING ONLY TWO SIDE DOORS

The present invention relates to the front seats of motor vehicles with only two side doors, of the type comprising a frame and means for connecting the frame to the floor of the motor vehicle, which enable the seat to be moved between a normal operative position and a forward inoperative position, in which access to the rear seats of the motor vehicle is facilitated, the connecting means comprising at least one pin-slot coupling operatively interposed between the seat frame and the floor of the motor vehicle and further including guide means allowing the adjustment of the operative position of the seat longitudinally of the motor vehicle.

Figures 3, 4, 5:
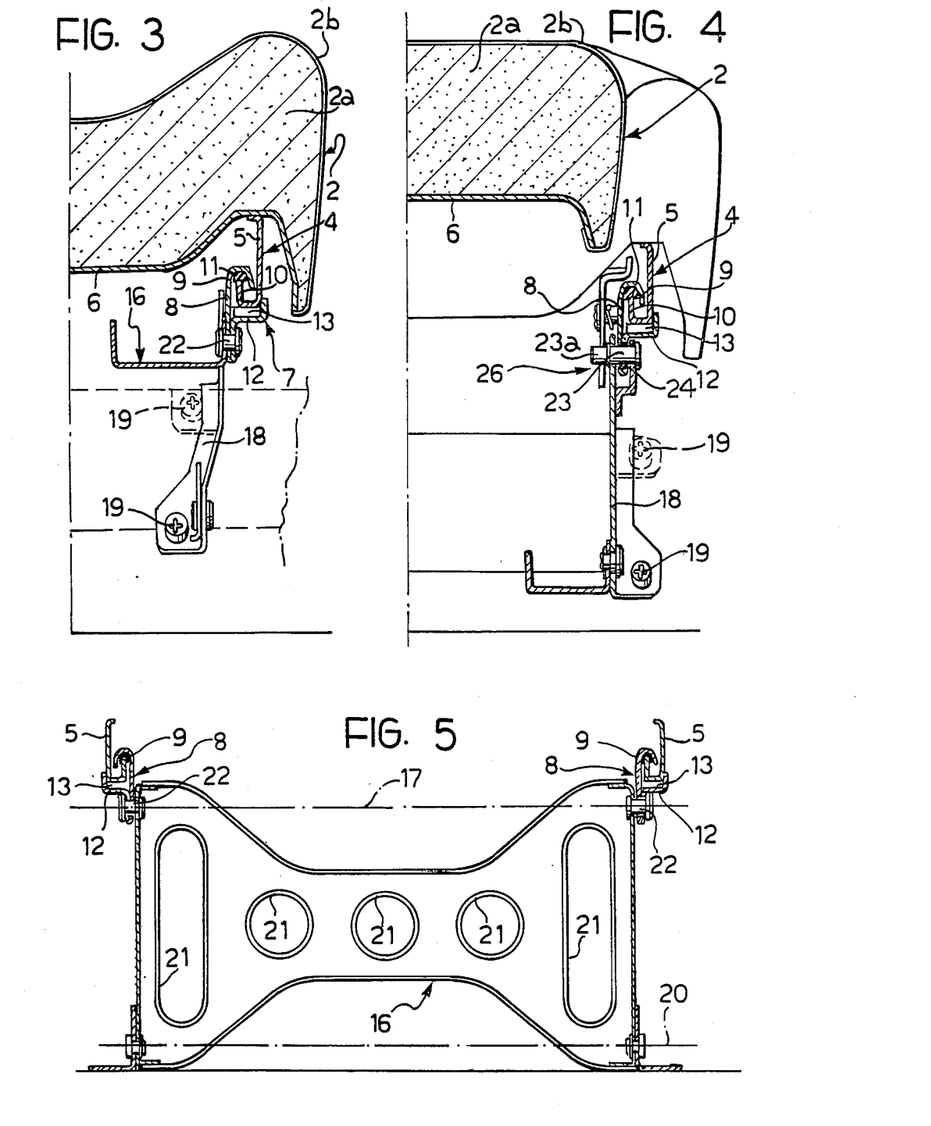
FIGS. 3 and 4 are sectional views of the seat of FIG. 1, taken on the lines III—III and IV—IV of FIG. 1 respectively.
FIG. 5 is a section taken on the line V—V of FIG. 2.
Figure 7:
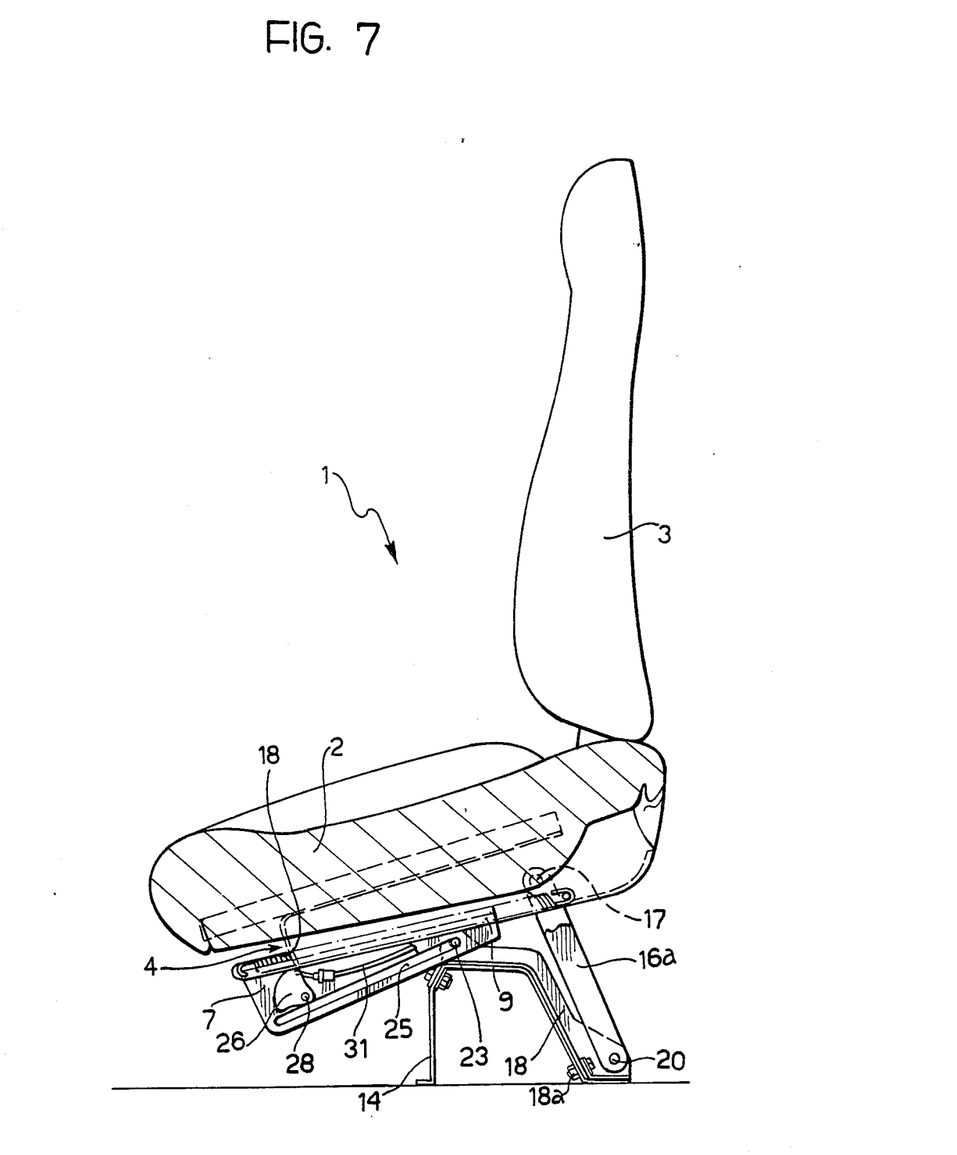
FIG. 7 shows the seat of FIG. 6 in a forward, inoperative position.

A seat of the aforesaid type is illustrated, for example, in FIGS. 5 and 7 of European patent application No. EP-A-No. 0 120 817. In this known solution, the device for adjusting the operative position of the seat longitudinally comprises two longitudinal profiled guide sections fixed to the floor of the motor vehicle, on which two respective sliding blocks are slidable. The seat frame is connected to the sliding blocks of the guide device by means of a pin-slot coupling and by means of a pair of side arms each of which has one end articulated to the rear part of the seat frame and its opposite end articulated to a respective sliding block. When access is needed to the rear seats of the motor vehicle, the front seat is moved forwards by the sliding of the pin in its slot and simultaneous pivoting the articulated arms. This solution is satisfactory in many ways since it frees a considerable space for access to the rear seats. At the same time, there is the problem that, in reaching the rear seats, it is possible for a person to knock one of the profiled guide sections fixed to the floor of the motor vehicle with his foot, and these sections also limit the space available for the feet of a person sitting on the rear seat.

The object of the present invention is to provide a seat of the type specified at the beginning of the present description, which leaves the floor completely clear.

In order to achieve this object, the subject of the invention is a front seat of the type indicated at the beginning of the present description, characterised in that the seat further includes an auxiliary support structure which supports the frame of the seat, in that the guide means allowing the adjustment of the operative position of the seat longitudinally of the motor vehicle are operatively interposed between the frame of the seat and the auxiliary support structure, and in that the pin-slot coupling is operatively interposed between the auxiliary support structure and the floor of the motor vehicle.

In the seat according to the invention, the adjustment of the operative position of the seat longitudinally of the motor vehicle is effected by moving the frame of the seat relative to the auxiliary support structure. When access is needed to the rear seats of the motor vehicle, the unit constituted by the entire structure of the seat, the auxiliary support structure and the longitudinal adjustment device interposed between them may be moved forwards relative to the floor of the motor vehicle, leaving the access space to the rear seats, as well as the floor of the passenger compartment in this region, completely clear.

In a first embodiment, the auxiliary support structure is connected to the motor-vehicle floor both by means of the pin-slot coupling and by means of at least one arm articulated at one end to the auxiliary support structure and at the other end to the motor-vehicle floor about axes transverse the length of the motor vehicle.

In a second embodiment, the means for connecting the frame of the seat to the motor-vehicle floor comprise both the pin-slot coupling between the auxiliary support structure and the motor-vehicle floor and at least one arm articulated at one end to the seat frame and at the other end to the motor-vehicle floor about axes transverse the length of the motor vehicle.

In a third embodiment, the auxiliary support structure is connected to the motor-vehicle floor by means of a front connection of the pin-slot type and by means of a rear connection which is also of the pin-slot type.

In a fourth embodiment, the means for connecting the seat frame to the motor-vehicle floor include both the pin-slot coupling, and rear connection means including at least one guide fixed to the motor-vehicle floor and extending in a longitudinal vertical plane, and a sliding block slidable in the guide and connected to the seat frame.

The various embodiments of the invention will now be described in detail with reference to the appended drawings, provided purely by way of non-limiting example, in which.

Figure 1:
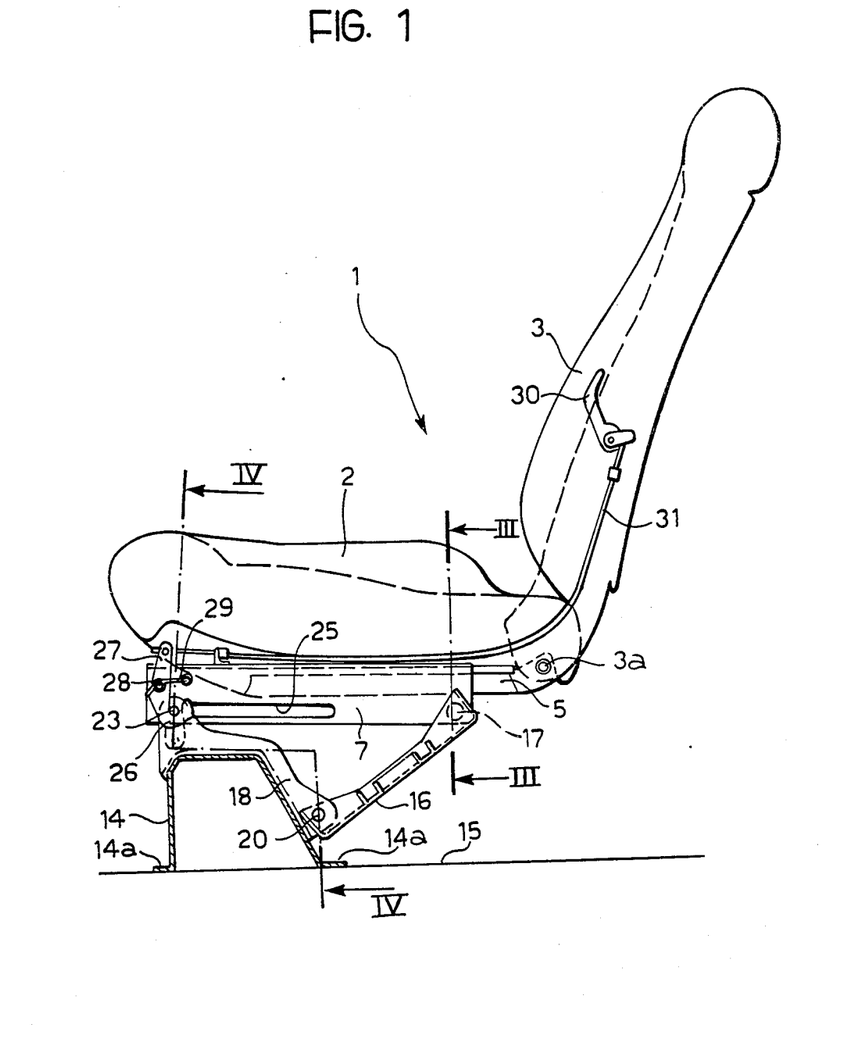
FIG. 1 is a schematic side view showing a first embodiment of a seat according to the invention in its normal operative position.

With reference to FIGS. 1-5, a front seat of a motor vehicle with only two side doors is generally indicated 1. The seat 1 comprises a squab 2 and a backrest 3 provided with a sheet-metal frame 4 including two side members 5 situated beneath the squab (see FIGS. 3 and 4). The embodiment illustrated in FIGS. 1-5 relates to the case in which the expanded plastics padding 2a of the squab 2 (see FIGS. 3 and 4), together with its covering material 2b, is carried by an auxiliary frame 6 which can be connected rapidly to the frame 4, by means of connecting means of any known type (not shown). An example of a structure of this type is described and illustrated for example in Italian patent application No. 53697-B/85 by the same Applicant. According to conventional techniques, the framework of the backrest is connected to the squab frame by means of two lateral supports of any known type (not illustrated) which enable the angular position of the backrest to be adjusted about a transverse axis 3a (FIG. 1).

The frame 4 of the seat is guided in an auxiliary sheet-metal support structure 7 comprising two side elements 8 (FIGS. 3 and 4) each having an upper longitudinal edge which is bent downwardly to define substantially an inverted-J-shaped cross-section. These bent edges define two longitudinal guides 9 in which the lower longitudinal edges 10 of the side members 5 are slidably engaged. The edges 10 are bent upwardly to define a substantially J-shaped cross-section and are slidably engaged from below in the cavity defined by the two edges 10, with the interposition of sliding blocks 11 constituted by plastics material with a low coefficient of friction and fixed to the edges 10. The longitudinal guides 9 enable the operative position of the seat to be adjusted longitudinally of the motor-vehicle. The guides are provided with locking means of any known type which enable the seat to be locked in the desired longitudinal position. These locking means do not fall within the scope of the present invention and have not been shown in the appended drawings because they may be of any known type and because their exclusion from the drawings makes the latter simpler and more easily understood.

In the embodiment of FIGS. 1-5, the guiding of the frame 4 in the auxiliary support structure 7 is improved by the fact that each side element 8 is bent downwardly to define an auxiliary edge 12 facing the lower edge of the respective side member 5, rollers 13 being interposed between the edge 12 and the side member 5.

In its turn, the auxiliary support 7 is connected, by connection means which will be described in detail below, to a sheet-metal cross member 14 (FIGS. 1, 2) having a bottom flange 14a fixed to the floor 15 of the car. The structure 7 is connected to the cross member 14 at its rear end by means of a pair of articulated side arms integrated in a single sheet-metal plate 16. The plate 16 is connected in an articulated manner to the rear end of the auxiliary structure 7 about a transverse axis 17. The plate 16 is also articulated to a bracket 18 fixed by means of screws 19 to the cross member 14 about a transverse axis 20 (see FIGS. 1, 2, 5). The use of a single sheet-metal plate 16 with weight-reducing holes 21 (FIG. 5) is preferable, from the point of view of rigidity of the assembly, to a solution involving two separate articulated arms situated at the two sides of the seat. The latter solution, however, constitutes an alternative which falls within the scope of the present invention. The articulated connection of the plate 16 to the two side elements 8 of the auxiliary support structure 7 is achieved by means of two articulation pins 22 (see FIGS. 3, 5). In correspondence with the front part of the seat, the two brackets 18 fixed to the cross member 14 carry two transverse pins 23, only one of which is visible in FIG. 4, each provided with a bush 24 of plastics material. The bush 24 is slidably engaged in a corresponding longitudinal slot 25 formed in the lower bent edge of the respective element 8 of the auxiliary support structure 7.

FIG. 1 of the appended drawings shows the seat in its normal operative position, in which each pin 23 is in contact with the front end of the respective slot 25. In this position, the seat is locked by means of a hook 26 adapted to engage an end 23a (FIG. 4) of the pin 23, this hook being carried by a rocker arm 27 articulated at 28 (FIG. 1) to the structure 7 and biased by a spring 29 towards a position in which the pin 23 is engaged. The lever 27 may be moved into a position in which the pin is disengaged by means of a control lever 30 (FIG. 1) situated on the side of the backrest and connected to the lever 27 by means of a Bowden cable 31.

Figure 2:
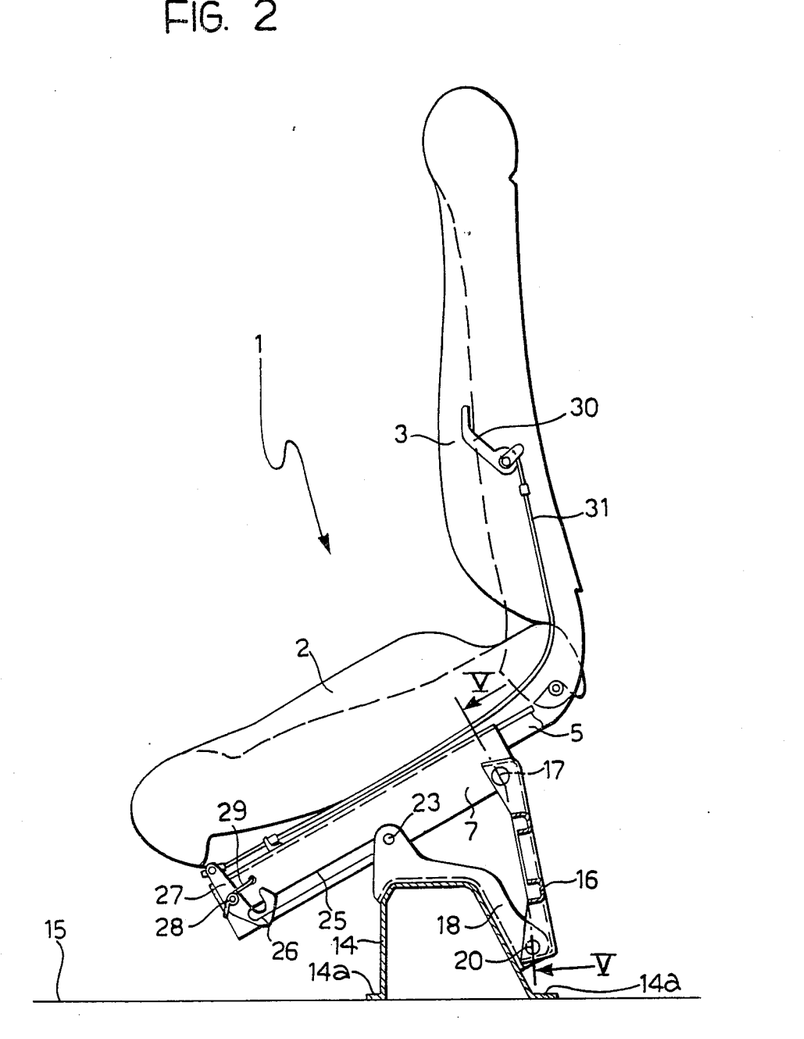
FIG. 2 shows the seat of FIG. 1 in a forward, inoperative position.

In order to facilitate access of the passengers to the rear seats, the seat 1 may be brought into the forward inoperative position shown in FIG. 2. This position may be reached after disengagement of the hook 26 from the pin 23 and by means of forward pivoting of said plate 16 about its articulation axis 20 and corresponding relative displacement of each pin 23 in the corresponding slot 25. In the forward position the pin 23 is in engagement with the rear end of the slot 25. When the seat is in the operative position shown in FIG. 1 it is possible to adjust its position longitudinally of the motor vehicle by sliding the frame 5 relative to the auxiliary support structure 7.

As is clear from FIGS. 1-5 and the preceding description, the above-described adjustments are made possible with a relatively simple and economical structure. A further advantage of the seat shown in FIGS. 1-5 to the invention lies in the fact that all the points of connection of the seat to the floor of the motor vehicle are made in correspondence with the cross member 14. It is therefore possible preliminarily to assemble the structure of the seat and connect it to the cross member 14, and subsequently to mount the entire unit constituted by the seat, the cross member and their connection means on the floor of the car, possibly by means of robots. Moreover, when the seat is in the inoperative, forward position (FIG. 2), the floor 15 in the region of access to the rear seats remains completely clear. Even when the seat 10 is in the operative position, the space available for the feet of the person sitting on the rear seat is considerable given the absence of profiled guide sections fixed to the floor. This advantage is further increased by the fact that the seat is mounted on the cross member 14, which is raised from the floor so that the lower surface of the seat is well spaced from the floor. These advantages are also common to the other embodiments described below.

Figure 6:
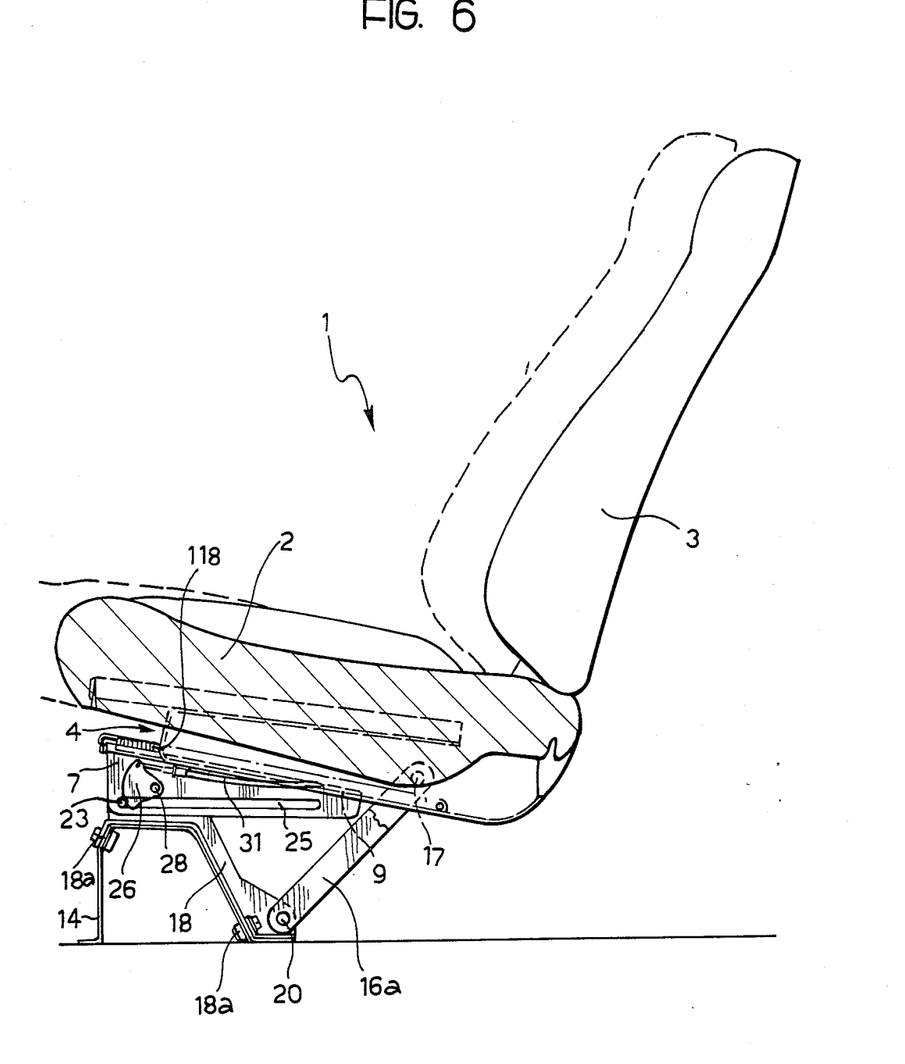
FIG. 6 is a schematic side view illustrating a second embodiment of the seat according to the invention in its normal operative position.

FIGS. 6 and 7 show a second embodiment of the seat according to the invention. In these drawings, the parts which correspond to those shown in FIGS. 1-5 are indicated by the same reference numerals. A first difference with respect to the seat shown in FIGS. 1-5 consists of the fact that the guides 9 formed in the auxiliary support structure 7 for adjusting the operative position of the seat longitudinally of the motor vehicle are inclined upwardly and forwardly so as to cause the seat to be raised as a result of its forward movement (see the broken line in FIG. 6 which indicates schematically a more forward position of the seat). People of lower stature who require the seat to be in a more forward position in fact generally also need to be seated in a higher position in order to have the best possible view. Forward movement of the seat relative to the guides 9 is facilitated by a helical spring 118 interposed between the auxiliary support structure 7 and the seat frame 4. Again in this case, the auxiliary support structure is connected to a support 18, fixed by bolts 18a to the cross member 14, by the engagement of the two transverse pins 23 in corresponding slots 25. At the rear, the seat is connected to the support 18 by means of two side arms 16a (which replace the sheet metal plate 16 of the seat of FIGS. 1–5). In this case, moreover, the ends of the arms 16a opposite the support 18 are articulated directly to the frame 4 of the seat at 17 instead of to the auxiliary support structure, as in the case of FIGS. 1–5.

FIG. 6 shows the seat in its normal operative position. The seat is locked in this position by means of a locking member 26 which is carried by the auxiliary support structure 7 and is biassed by a spiral spring (not illustrated) towards the locked position illustrated in FIG. 6. When the operative position of the seat is to be adjusted longitudinally, by means of the sliding of the frame 4 relative to the guides 9, the seat is also moved into a higher position—as already indicated—as a result of the inclination of the guides 9, and also pivots slightly about the axis of the pins 23 as a result of the connection formed by the arms 16a between the frame 4 and the support 18.

FIG. 7 shows the seat in the inoperative forward position which is reached upon relese of the member 26 by means of the Bowden cable 31, forward rotation of the arms 16a and sliding of the slots 25 on the transverse pins 23.

Figure 8:
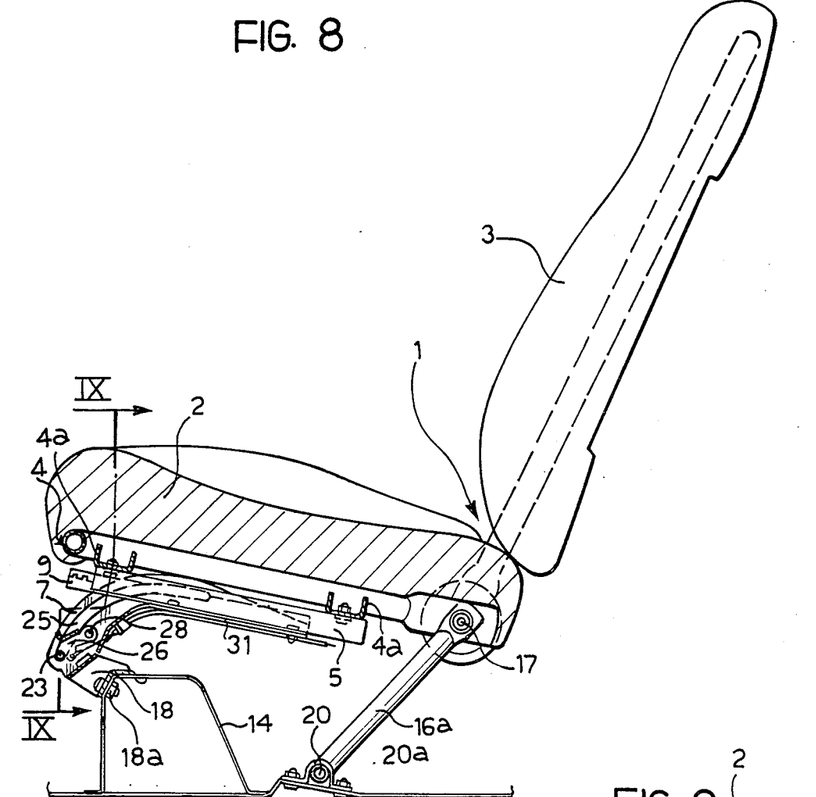
FIG. 8 shows a variant of FIG. 6.
Figure 9:
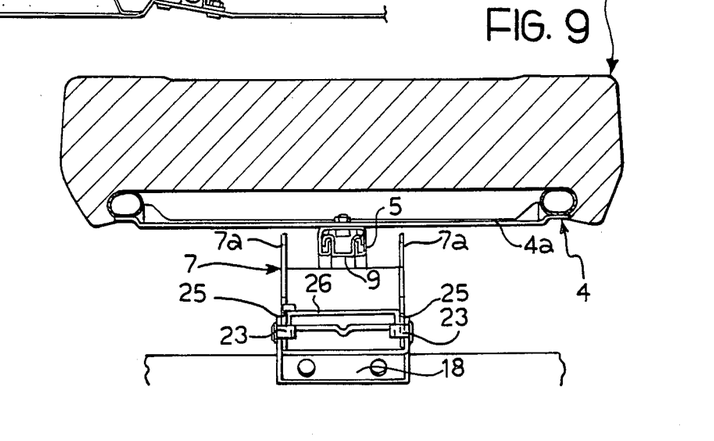
FIG. 9 shows a section taken on the line IX—IX of FIG. 8.

FIGS. 8 and 9 show a variant of the embodiment illustrated in FIGS. 6 and 7. In these drawings parts in common with those of FIGS. 1–7 are again indicated by the same reference numerals. The main difference with respect to the solution of FIGS. 6 and 7 lies in the fact that the front parts of the slots 25 are curved downwardly in order to achieve a different movement of the seat when it is moved into its forward, inoperative position. The slots 25 are formed in the two side walls 7a of a channel-sectioned profiled element constituting the auxiliary support structure 7 (FIG. 9). The front part of the base of the channel-shaped element 7 has a curved shape similar to that of the slots 25 (FIG. 8). The device for adjusting the longitudinal operative position of the seat comprises a single straight profiled guide section 9 bolted to the rear, straight part of the base of the auxiliary support structure 7. A profiled section 5 is slidably engaged with the profiled section 9 and is in turn bolted to two cross members 4a which form part of the seat frame 4. Another difference with respect to the variant of FIGS. 6 and 7 lies in the fact that the support 18 is used solely for supporting the transverse pins 23 which engage the slots 25, whilst the articulations 20 of the two arms 16a are formed by separate supports 20a fixed to the floor. In the variant of FIGS. 8 and 9, moreover, the articulation axis 17 of the upper ends of the arms 16a coincides with the axis of articulated connection between the frame of the squab and the frame of the seat backrest.

Figure 10:
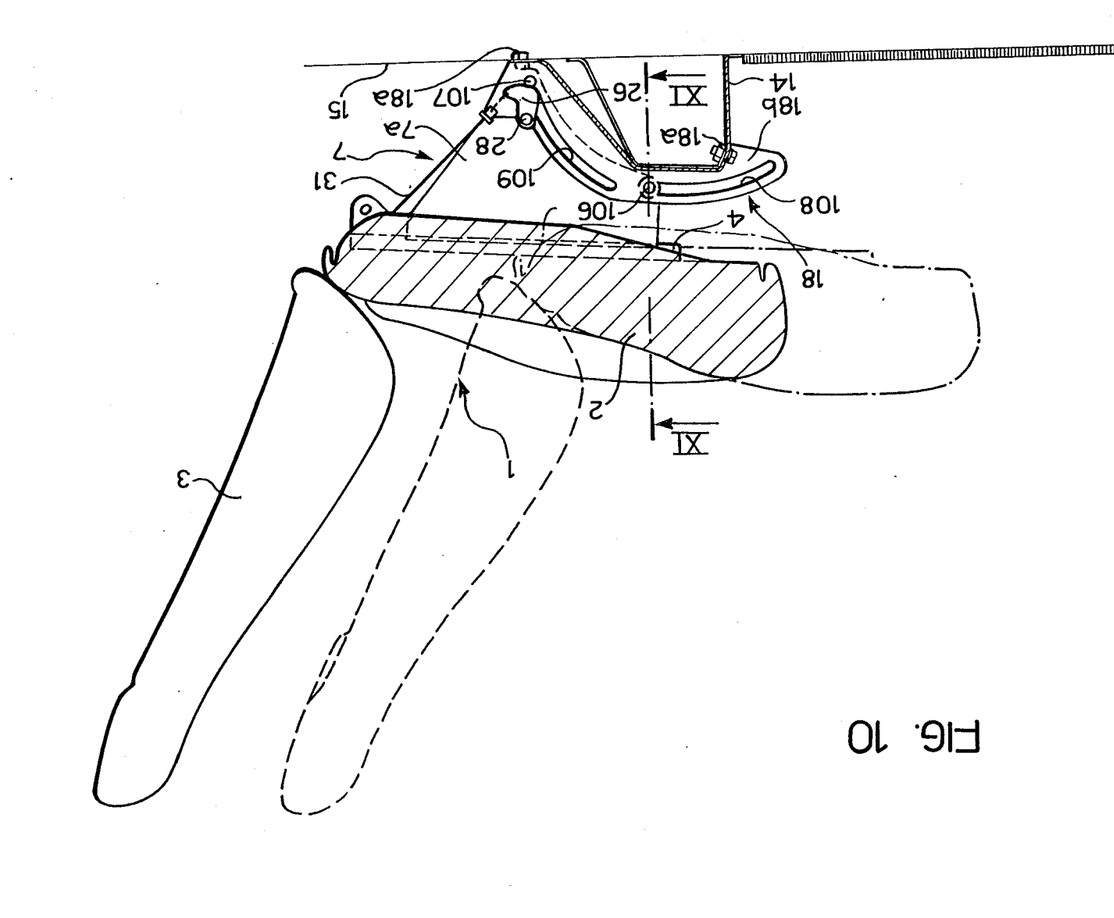
FIG. 10 is a schematic side view of a third embodiment of the seat according to the invention, relating to its normal operative position.
Figure 11:
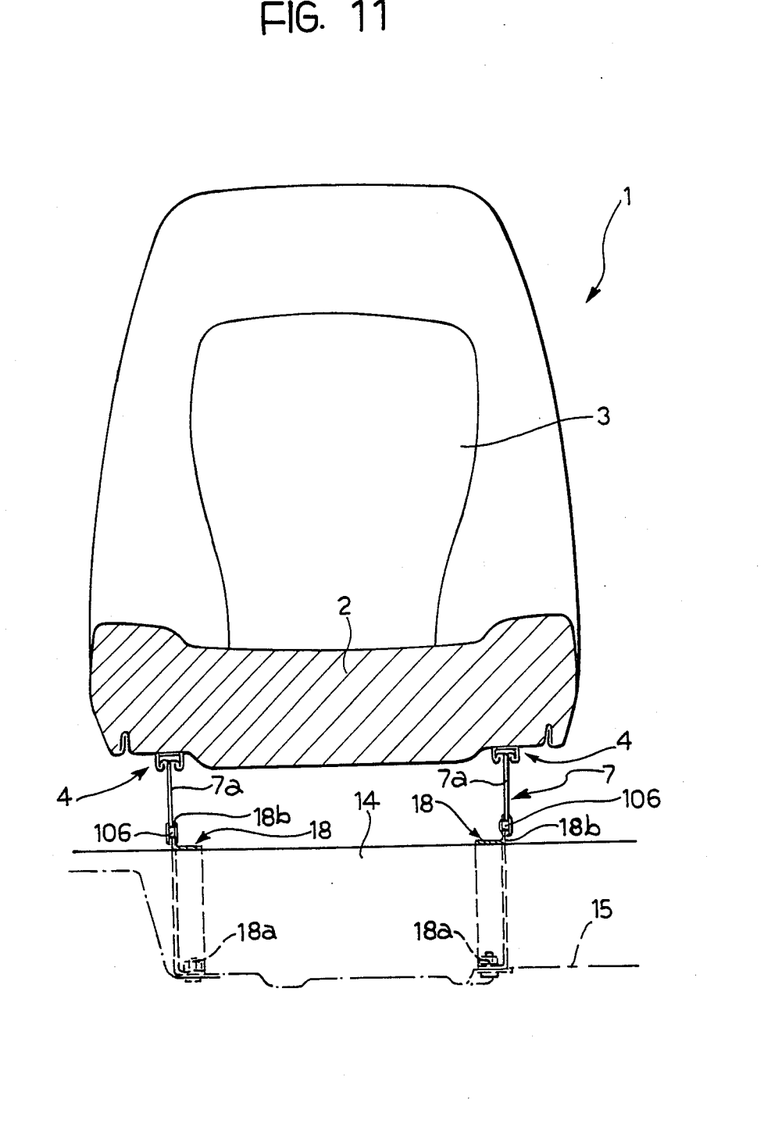
FIG. 11 is a section taken on the line XI—XI of FIG. 10.

FIGS. 10 and 11 show a third embodiment of the invention. In these drawings parts in common with those of the embodiments described above are again indicated by the same reference numerals. In the embodiment illustrated in FIGS. 10 and 11, the auxiliary support structure 7 is connected to the support 18 on each side of the seat by means of a front coupling and a rear coupling, both of the pin-slot type. In particular, the support 18 comprises two brackets fixed to the cross member 14 by means of bolts 18a and having flanges 18b parallel to the longitudinal vertical plane of the motor vehicle, each of which is formed with two slots 108 and 109. The two slots 108 and 109 are curved in shape with their concavities facing downwardly and are arranged on two circumferences which do not coincide for reasons which will be explained below. The two slots are engaged by transverse pins 106 and 107 carried by two side walls 7a constituting the auxiliary support structure 7. The upper edges of the side walls 7a act as guides for the two profiled elements which form part of the seat frame 4.

FIG. 10 shows the seat in its normal operative position. In this position, the transverse pins 106 and 107 are engaged in the rear ends of the slots 108 and 109. The seat may be moved from this position to a forward operative position to allow access to the rear seats of the motor car. The forward position is reached as a result of movement of the two walls 4a and corresponding sliding of the pins 106 and 107 in the slots 108 and 109. As already indicated, in the embodiment illustrated the centre lines of the two slots 108 ad 109 are circumferential arcs arranged on different circumferences. Thus movement of the seat to its forward, inoperative position does not correspond simply to pivoting about an axis transverse the longitudinal vertical plane of the car, but to a more complex movement, which enables the seat to be brought into an optimal position, providing the maximum space for access to the rear seats. In particular, in the course of its forward movement, the seat also pivots about the axis of the pins 106. However, the slots 108 and 109 could obviously have a different conformation and arrangement from that illustrated purely by way of example. For example, the slots could be straight slots inclined to each other.

Figure 12:
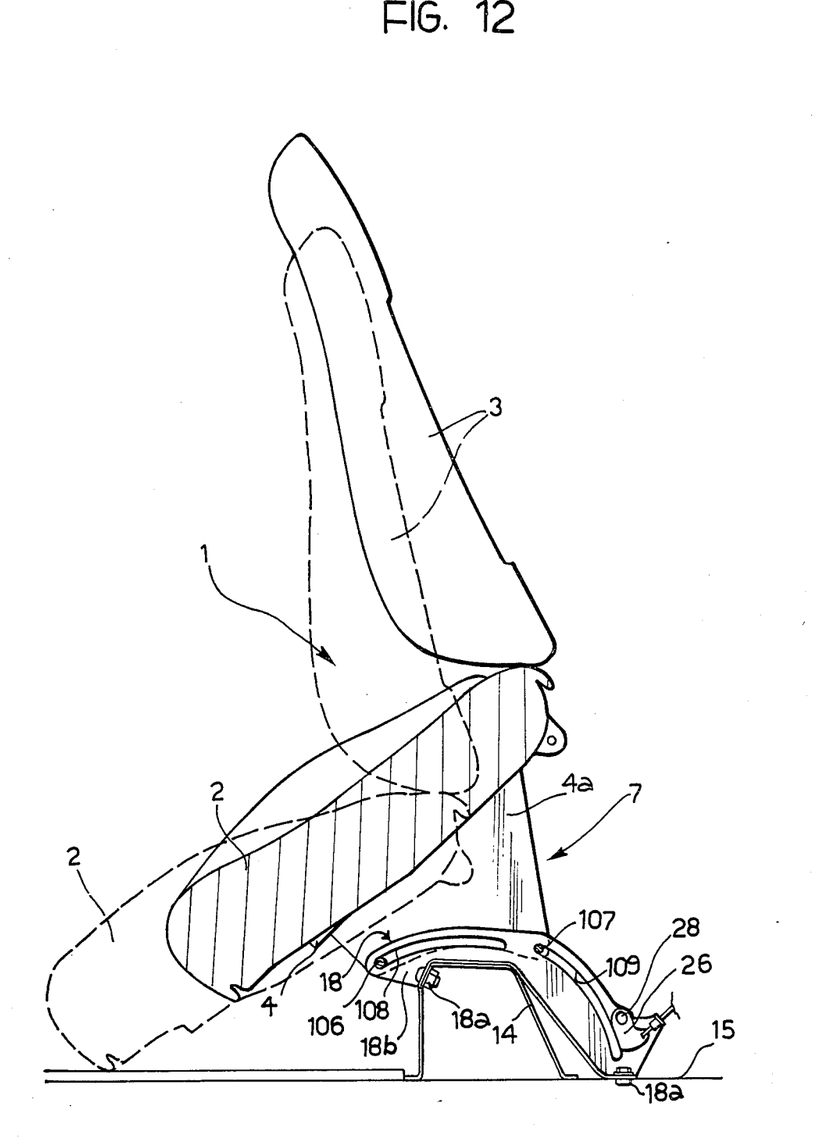
FIG. 12 shows the seat of FIG. 10 in its forward inoperative position.

FIG. 12 shows the seat in its inoperative forward position. Naturally the position assumed by the seat in this condition also depends on the position of the seat frame 4 relative to the auxiliary support structure 7. In FIG. 10 the operative position of the seat, corresponding to the rearmost position of the frame 4 relative to the auxiliary support structure 7 is shown in continuous outline and the furthest forward position of the seat is shown in broken outline. In FIG. 12 the inoperative, forward position of the seat which is reached when the frame 4 is in its rearmost position is shown in continuous outline. The broken line, also in FIG. 12, shows the inoperative forward position of the seat which corresponds to the furthest forward position of the frame 4.

As is clear from the above description, the seat illustrated in FIGS. 10–13 has a simple and cheap structure. The whole unit formed by the seat, the auxiliary structure 7 and the support 18 can be mounted on the floor of the car in a single operation, possibly with the aid of robots.

FIGS. 13–16 of the appended drawings shown a fourth embodiment which is essentially similar to the variant illustrated in FIGS. 8 and 9 of the appended drawings. In FIGS. 13–16, parts in common with those illustrated in FIGS. 8 and 9 are indicated by the same reference numerals. A small difference with respect to the variant of FIGS. 8 and 9 lies in the fact that the two pins 23 which engage the slots 25 formed in the channel-shaped profiled element 7 are integrated in a single bolt 23 (FIG. 14) which is clamped to the side walls of the U-shaped bracket which constitutes the support 18 by means of a nut 23a. The main difference, however, lies in the fact that the connection between the rear part of the seat frame 4 and the floor of the motor vehicle is achieved by means of two side arms 126 which are fixed rigidly to the seat frame 4 and which carry two transverse pins 127 at their lower ends (see FIGS. 13, 15), instead of by means of two articulated arms 16a. The transverse pins 127 each carry a sliding block 128 of plastics material with a low coefficient of friction which is slidable in a profiled guide section 129 fixed to a respective vertical wall of the motor car floor. The profiled section 129 has an essentially C-shaped cross-section with inwardly facing edges which define a slot extending in a longitudinal vertical plane. Each of these slots is curved (see FIG. 13) so as to cause a progressive and continuous raising of the seat when it is moved towards its inoperative forward position.

Figure 13:
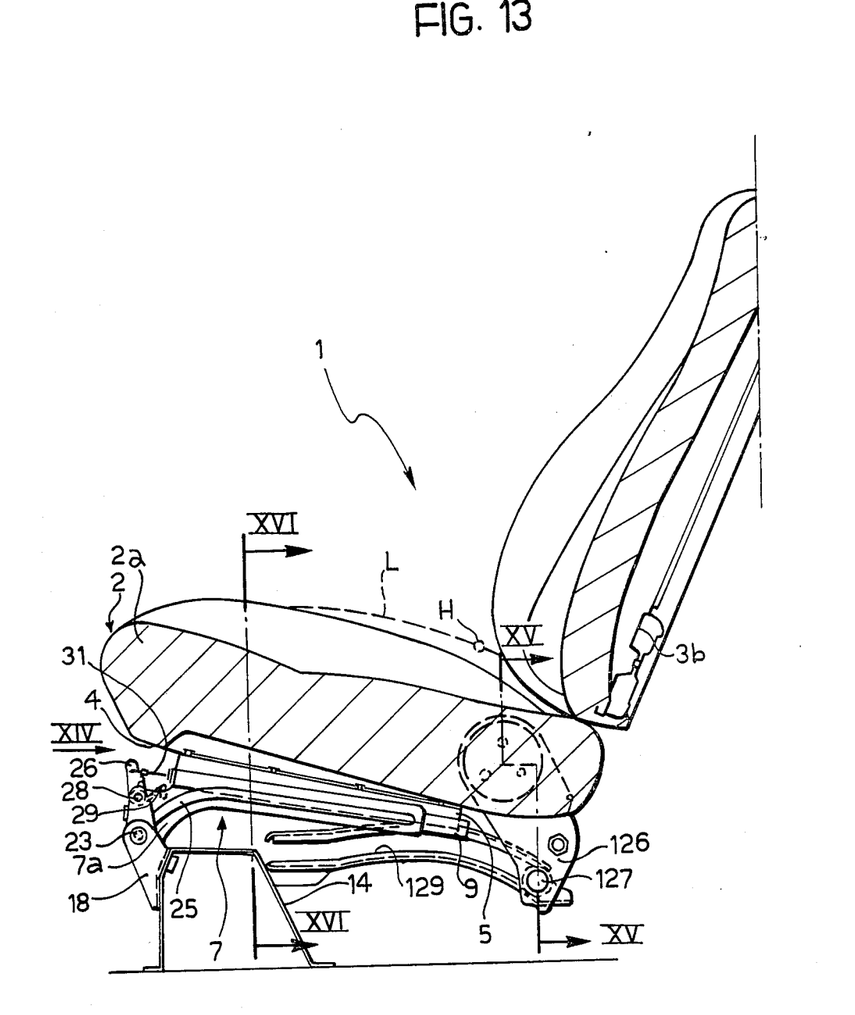
FIG. 13 is a schematic side view of a fourth embodiment of the seat, according to the invention.

In use, when the operative position of the seat is to be altered longitudinally of the motor vehicle, the seat frame 4 is slid relative to the auxiliary support structure 7, causing a corresponding sliding of the sliding blocks 128 in the profiled guide sections 129. The particular shape of these profiled guides causes a predetermined variation in the height of the seat squab, as well as pivoting the entire seat about the axis of the pin 23. In FIG. 13, the line L shows the path travelled by a point H, corresponding essentially to the hip joint of a seated person, as a result of the longitudinal movement of the seat. When access is required to the rear seats, the lever 26 must first of all be released by means of the cable 31, after which the entire seat unit can be moved forwards, this using the ability of the pin 23 to slide within the guide slots 25 and of the sliding blocks 128 to slide within their lateral guides 129.

Figures 14, 15, 16:
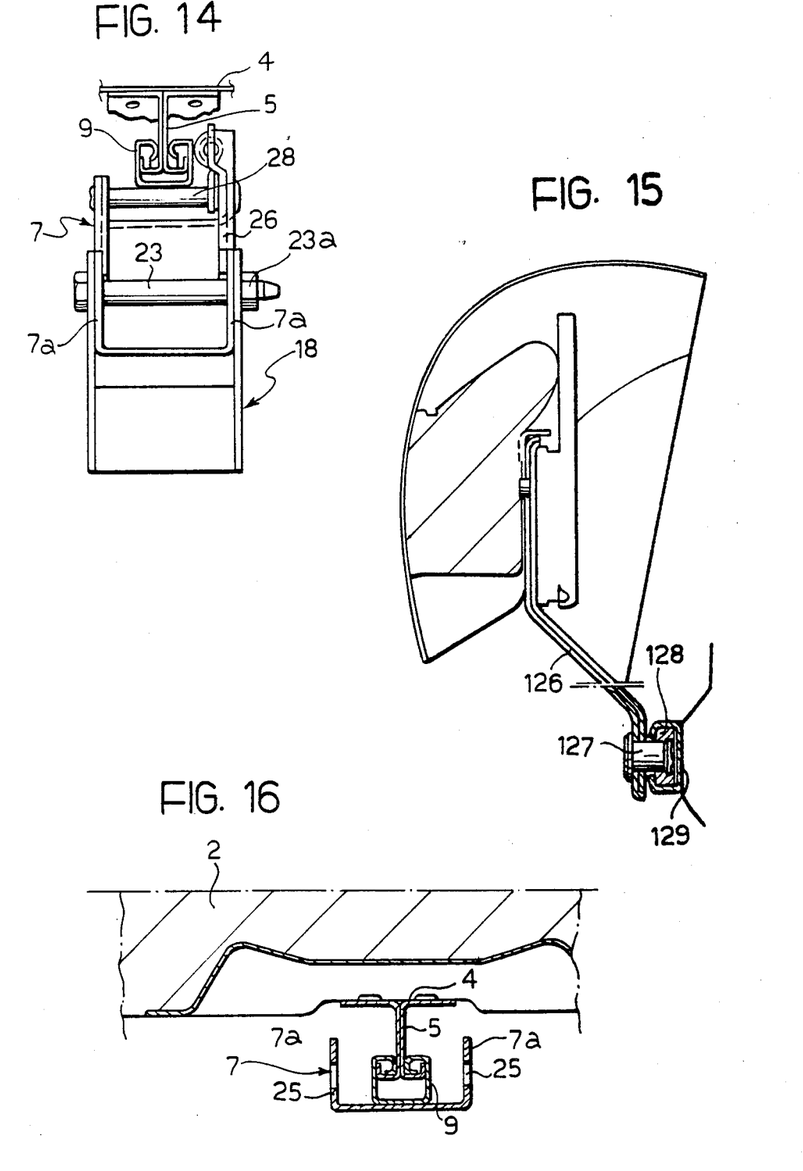
FIG. 14 is a view taken on the arrow XIV—XIV of FIG. 13.
FIG. 15 is a section taken on the line XV—XV of FIG. 13.
FIG. 16 is a section taken on the line XVI—XVI of FIG. 13.

As can be seen in FIGS. 14 and 16, the embodiment illustrated in these drawings also differs from that of FIGS. 8 and 9 in the different section of the profiled elements 5 and 9.

Naturally, the principle of the invention remaining the same, the forms of embodiment and details of construction may be varied widely with respect to those described and illustrated purely by way of example, without thereby departing from the scope of the present invention.

I claim:

1. A front seat for a motor vehicle with only two side doors, comprising a frame (4) and means for connecting the frame (4) to the floor (15) of the motor vehicle which enables the seat to be moved between a normal operative position and an inoperative forward position in which access to the rear seats of the motor-vehicle is facilitated, the connecting means comprising at least one pin-slot coupling (23, 25) operatively interposed between the seat frame (4) and the motor-vehicle floor (15) and further including guide means (5, 9) allowing the adjustment of the operative position of the seat longitudinally of the motor-vehicle, characterised in that the seat further includes an auxiliary support structure (7) which supports the seat frame (4), in that said guide means allowing the adjustment of the operative position of the seat longitudinally of the motor-vehicle are operatively interposed between the seat frame (4) and the auxiliary support structure (7) and in that the pin-slot coupling (23, 25) is operatively interposed between the auxiliary support structure (7) and the motor-vehicle floor (15).

2. A seat according to claim 1, characterised in that the auxiliary support structure (7) is connected to the motor-vehicle floor both by means of the pin-slot coupling (23) and by means of at least one arm (16) articulated at one end to the auxiliary support structure (7) and at its other end to the motor vehicle floor (15) about axes (17, 20) transverse the length of the motor vehicle.

3. A seat according to claim 1, characterised in that the means for connecting the seat frame to the motor-vehicle floor comprise both the pin-slot coupling (23, 25) between the auxiliary support structure (7) and the motor-vehicle floor (15) and at least one arm (16a) articulated at one end to the seat frame (4) and at the other end to the motor-vehicle floor (15) about axes (17, 20) transverse the length of the motor vehicle.

4. A seat according to claim 2 or claim 3, characterised in that the pin-slot coupling comprises a slot (25) formed in a vertical wall of the auxiliary support structure (7) parallel to the longitudinal axis of the motor vehicle, the slot (25) being engaged by a pin (23) fixed to the motor-vehicle floor (15).

5. A seat according to claim 4, characterised in that the pin (23) of the pin-slot coupling (23, 25) and the end of the articulated arm (16) nearest the foor (15) are carried by a single, common support (14, 18) which can be fixed to the floor so that the entire structure of the seat and the common support constitute a unit which can be assembled before being fitted into the motor vehicle.

6. A seat according to claim 4, characterised in that it includes two parallel, lateral pin-slot couplings (23, 25).

7. A seat according to claim 2 or claim 3, characterised in that it includes two parallel, lateral articulated arms.

8. A seat according to claim 7, characterised in that the two articulated arms are integrated in a single sheet metal structure (16).

9. A seat according to claim 2 or claim 3, characterised in that the seat frame (4) includes two side members (5) which are essentially J-shaped in cross section and in that the auxiliary support structure (7) includes two side elements (8) having portions which are essentially inverted J-shaped in cross-section and define the guides (9) for the two side members (5) of the frame (4).

10. A seat according to claim 2 or claim 3, characterised in that means (26) are provided for locking the pin-slot coupling (23, 25) in the configuration which corresponds to the normal operative position of the seat.

11. A seat according to claim 5, characterised in that the common support includes a part (14a) for fixing to the floor (15) of the motor-vehicle, and a part (14) which extends upwardly for connection to the seat structure.

12. A seat according to claim 1, characterised in that the guide means are inclined upwardly at the front.

13. A seat according to claim 4, characterised in that the slot (25) is straight.

14. A seat according to claim 4, characterised in that the slot (25) has a shape which curves downwardly towards the front.

15. A seat according to claim 1, characterised in that the guide means comprise two lateral guide devices.

16. A seat according to claim 1, characterised in that the guide means comprise a single central guide device.

17. A seat according to claim 1, characterised in that the auxiliary support structure (7) is connected to the floor (15) of the motor vehicle by means of a front connection (106, 108) of the pin-slot type, and by means of a rear connection (107, 109) which is also of the pin-slot type.

18. A seat according to claim 17, characterised in that the two pin-slot connections comprise two transverse pins (106, 107) carried by the auxiliary support structure (7) and two slots (108, 109) slidably engaged by the pins, the slots being formed in a support (18) fixed to the floor (15) of the motor vehicle.

19. A seat according to claim 18, characterised in that the auxiliary support structure (7) comprises two vertical walls (7a) parallel to the longitudinal plane of the motor car and carrying the pins (106, 107), the two slots (108, 109) being formed in two vertical walls (18b) of the support (18) fixed to the floor (15) and each being engaged by a respective transverse pin.

20. A seat according to claim 17, characterised in that the slots (108, 109) follow curved paths with their concavities facing downward.

21. A seat according to claim 20, characterised in that the slots (108, 109) have their centre lines arranged on different circumferences.

22. A seat according to claim 1, characterised in that the means for connecting the seat frame (4) to the floor of the motor vehicle comprise both the pin-slot coupling (23, 25) and rear connection means including at least one guide (129) fixed to the floor and extending in a vertical longitudinal plane, and a sliding block (128) slidably mounted within the guide (129) and connected to the seat frame (4).

23. A seat according to claim 22, characterised in that the rear connection means include two rear side arms (126) fixed rigidly to the seat frame (4), their lower ends being provided with two sliding blocks (128) which are slidable in respective lateral, profiled guide sections (129) fixed to two vertical walls of the floor.

24. A seat according to claim 23, characterised in that the means for guiding the adjustment of the longitudinal position of the seat comprise a first profiled element (5) fixed to the centre of the seat frame (4) and a second profiled element (9) in which the first profiled element (5) is slidable and which in turn is fixed to the auxiliary support structure (7).

25. A seat according to claim 24, characterised in that the auxiliary frame (7) is constituted by a channel-sectioned profiled element whose base wall is fixed to the second profiled element (9) and whose side walls (7a) have two guides slots (25) for a front transverse pin (23) carried by the floor.

* * * * *